May 18, 1937.  P. H. HUTCHINSON  2,080,941
CUTTING MACHINE
Filed Oct. 4, 1927   3 Sheets-Sheet 1
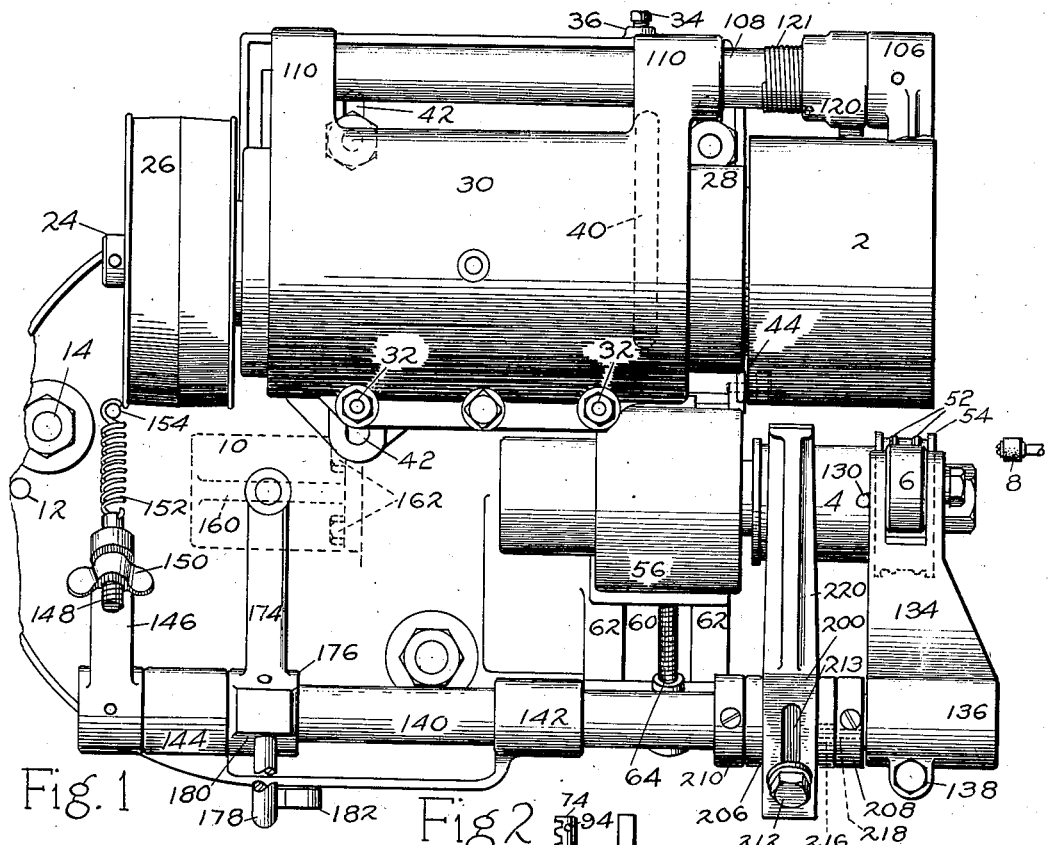
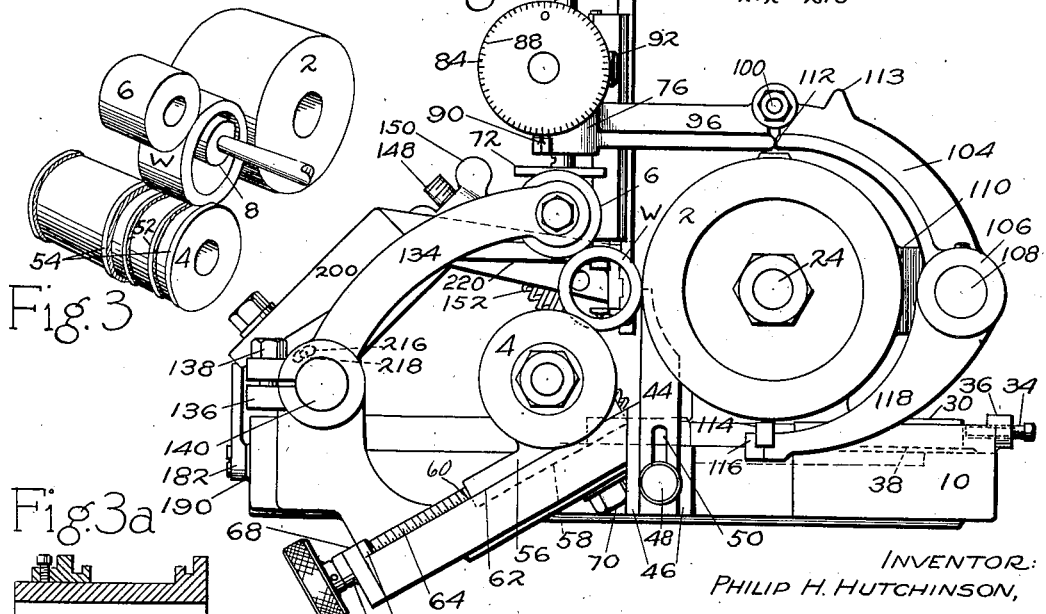
INVENTOR:
PHILIP H. HUTCHINSON,
BY Giles P. Moore
HIS ATTORNEY.

May 18, 1937.  P. H. HUTCHINSON  2,080,941
CUTTING MACHINE
Filed Oct. 4, 1927  3 Sheets-Sheet 2
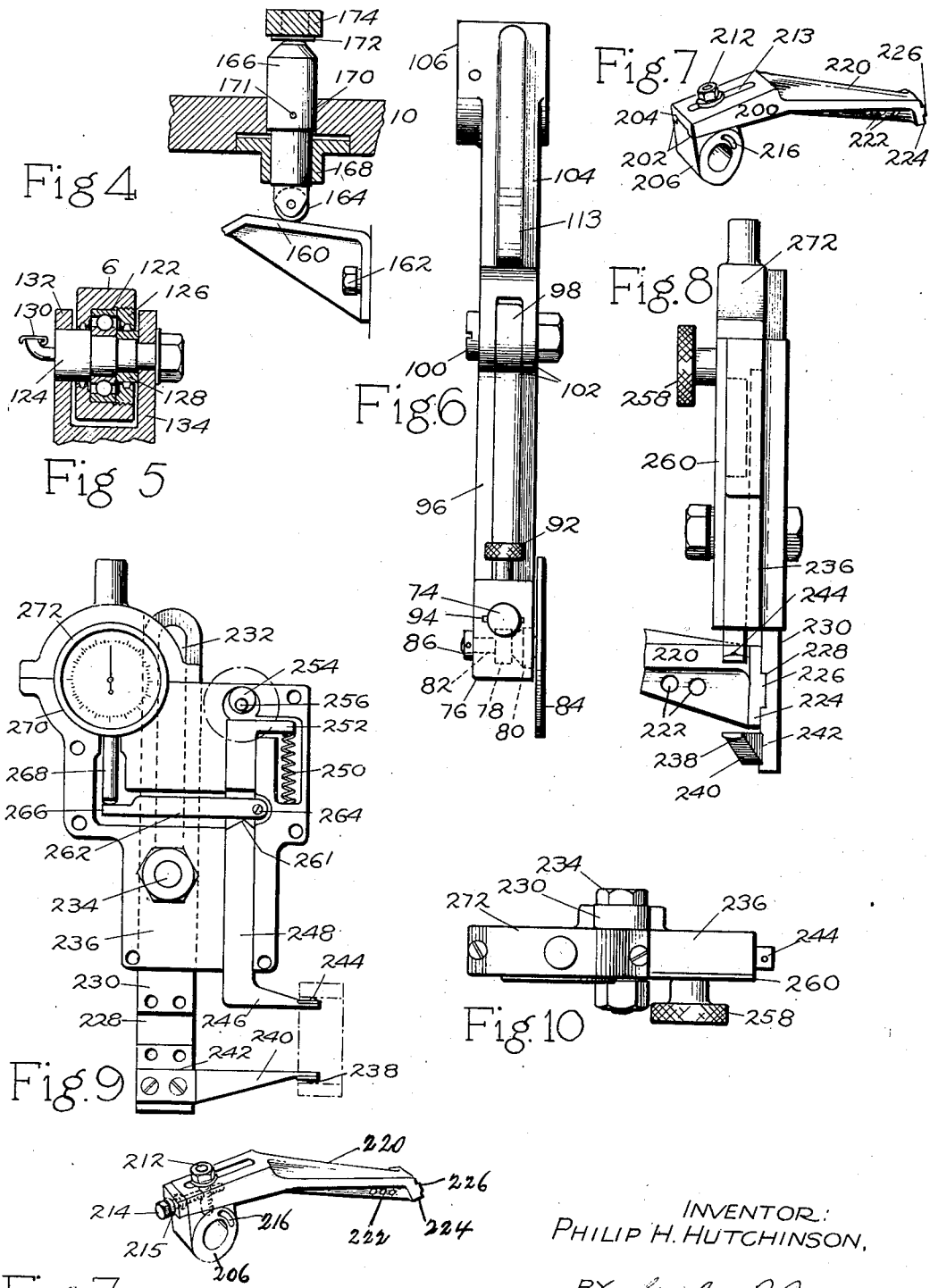
INVENTOR:
PHILIP H. HUTCHINSON,
BY Gales P. Moore
HIS ATTORNEY.

INVENTOR
PHILIP H. HUTCHINSON,
BY Gales P. Moore
HIS ATTORNEY.

Patented May 18, 1937

2,080,941

UNITED STATES PATENT OFFICE 2,080,941

CUTTING MACHINE

Philip H. Hutchinson, Montclair, N. J., assignor to General Motors Corporation, Detroit, Mich., a corporation of Delaware Application October 4, 1927, Serial No. 223,994

55 Claims. (Cl. 51—103)

This invention relates to cutting machines and gauges therefor and comprises all the features of novelty herein disclosed in connection with a chuckless internal grinder and a feeler gauge for indicating the size of the work and automatically controlling the finishing operations.

In internal grinding machines which employ a chuck, the work is usually gripped externally and the bore of the work is ground concentric with the axis of the chuck. Due to errors of locating which are inherent in a chuck, the piece is frequently gripped slightly eccentric or cocked with respect to the chuck axis and the wall thickness of the ground piece will accordingly vary. This variation in wall thickness is aggravated by any out-of-round condition in the external periphery of the piece, such as may occur from the high spots left by the action of a centerless grinder. The bore, though round, is apt to be inaccurately sized because the outer periphery of the piece is surrounded by chuck parts and hence the piece cannot be kept as cool as desired. An indicator gauge will then measure the piece in its expanded condition due to heat but the heat also affects the gauge itself so that, upon subsequent cooling, the piece is a different size from that inaccurately indicated by the gauge. The gauge, being mounted on a support independently of the chuck, is also affected by inaccurate centering of the work in the chuck and by lateral displacement of the chuck and of the work due to the pressure of the cutting tool. When a race ring for antifriction bearings, for instance, is so ground, the variation in wall thickness will cause a deformation of the bore when the piece is forced into a round bearing housing.

An object of the invention, accordingly, is to provide a cutting machine and a gauge therefor which will avoid the above and other difficulties and produce work of extreme accuracy at low cost. Another object is to provide an improved chuckless machine for cutting bores. Yet another object is to provide an improved work locating mechanism for a chuckless headstock. Yet another object is to provide mechanism for facilitating the loading of work-pieces on a chuckless cutting machine. To these ends and also to improve generally upon devices of the character indicated the invention consists in the various matters hereinafter described and claimed.

In the drawings, Figure 1 is a plan view of the chuckless head stock with the gauge removed.

Fig. 2 is an end elevation.

Fig. 3 is a perspective view showing the relation of the work supporting wheels to the work and the grinding wheel.

Fig. 3a is a section of an improved form of supporting wheel.

Fig. 4 is a sectional view of a portion of the mechanism for moving the gauge and pressure applying idler wheel.

Fig. 5 is a sectional view of the pressure applying idler wheel.

Fig. 6 is a plan view of work locating mechanism.

Fig. 7 is a perspective view of a gauge supporting arm and Fig. 7a is a similar view of a modification.

Fig. 8 is an end view of an indicator gauge.

Fig. 9 is a front view of the gauge, the cover plate being removed.

Fig. 10 is a plan view of the gauge.

Figure 14:
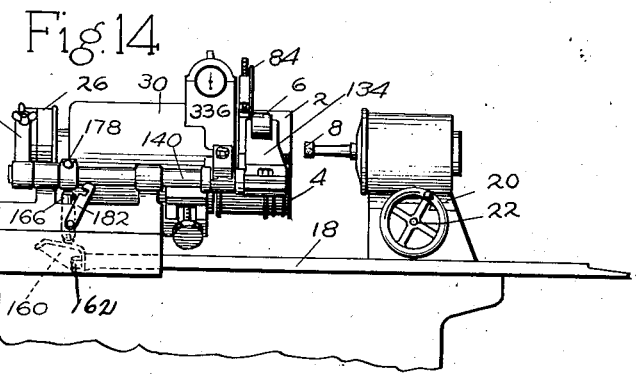
Fig. 14 is a front elevation showing the application of the chuckless headstock and gauge to an internal grinding machine.

The work-piece W, such as a sleeve or ring to be internally machined or ground, is rotatably supported between a backing wheel 2, a supporting idler wheel 4 and a pressure applying idler wheel 6, all the wheels turning on axes that are precisely parallel to one another when the work-piece is a straight hollow cylinder. A cutting tool, such as a grinding wheel 8, engages the inner face of the work-piece at a point or line directly opposite the line of contact between the outer periphery of the work-piece and the periphery of the backing wheel 2. One or more of the wheels is driven at a speed usual to that of a chuck and preferably the backing wheel 2 is driven in which case it also controls the speed of rotation of the work. When straight hollow cylinders are being machined, the axis of the grinding wheel is maintained parallel to the axes of the other wheels but is fed in a plane including the axis of the backing wheel 2 and the line of contact of this wheel with the work. The grinding wheel is also preferably given an axial reciprocation. The work supporting wheels are supported on a base 10 located by a dowel pin 12 and secured by bolts 14 to a bridge 16 (see Figure 14) which straddles the usual reciprocating carriage 18 of an internal grinding machine. The carriage supports a cross slide 20 which carries the grinding wheel head and is fed crosswise by a feed screw 22 operated intermittently by the machine in any usual or desired manner, as shown in detail by patents to Heald, 1,751,202 and Guild 1,684,486, for instance.

The wheel 2 is preferably a cast iron or hard steel wheel fixed to a shaft 24 driven by a pulley 26 and journalled in bearings in a sleeve 28 removably held in a split head 30 by clamping bolts 32. The head 30 is adjustable from front to rear by a screw 34 threaded in a lug 36 on the base 10 and engaging the head. The head is slidably supported on ways 38 and is guided in any suitable way (as by a key 40 positioned as indicated by dotted lines in Fig. 1). The head 30 is clamped in adjusted position by bolts run up through the base into slots 42, adjustment being desirable from time to time as the wheel 2 wears away. The work contacting line of the wheel 2 is located by means of the edge of a wheel setting plate 44 vertically arranged at one side of the wheel and held between vertical ribs 46 on the base by a clamping bolt 48 which passes through a slot 50 in the plate and is threaded in an opening of the base. The slot 50 allows the wheel setting plate to be dropped out of the way of the grinding wheel when the latter is used to true the wheel 2.

The supporting idler wheel 4 has peripheral ribs or rails 52 to support the work-piece at two separated points and has end flanges 54 to hold the work-piece from axial movement. For work of different lengths, one rail 52 and one guide flange 54 may be formed on a collar adjustably secured on the wheel hub by a set screw as shown in Fig. 3a. The wheel 4 is fixed to a shaft mounted to rotate in bearings in a slidable block or carrier 56 having a depending tongue 58 guided in a slot 60 between inclined slideways 62 projecting from the base 10. The block or carrier is adjustable on the inclined ways in order to move the supporting idler wheel 4 to such a position that it will support a work-piece of any selected diameter with its center in the plane through the axis of the wheel 2 and through the axis of the grinding wheel 8. The block is adjusted by a screw 64 threaded in the block and held from axial movement by collars 66 at the front and rear of a notched plate 68 fastened at the lower ends of the inclined ways. A clamping bolt 70 extending upwardly through a slot in the incline into the block holds the latter in adjusted position. In order to determine the proper location of the wheel 4 for a given size of work-piece before clamping the slide block, a reference plate or jig is employed. It comprises a flat plate 72 whose lower surface is parallel to the plane through the axis of the wheel 2 and through the axis of the grinding wheel. The plate 72 is attached to the lower end of a rack 74 guided in a slot in a casing 76 and turning a pinion 78 and a bushing 80 pinned to a shaft 82 in a recess of the casing. A dial 84 is secured to the bushing and a collar 86, pinned to the shaft outside the casing, holds the parts in assembled relation. The dial is graduated and marked with numbered lines 88 cooperating with an index line 90 on a lug of the casing. The numbered lines refer to the diameters of work-pieces. A clamping screw 92 for the rack can be loosened to let the reference plate 72 engage a master or reference work-piece of known external size resting against the wheels 2 and 4. The wheel 4 is then adjusted by sliding its block on the inclined ways 62 until the lift of the work-piece against the reference plate moves the proper size line on the dial opposite the index line. The piece is then in its correct location for grinding. If desired, the reference plate can be first clamped in the proper indicated position and then the wheel 4 can be adjusted until the supported work-piece contacts with the reference plate. A pin 94 on the rack keeps the rack from dropping out of the casing. When the work-piece is located, the reference plate is swung out of the way. The casing 76 is carried by an arm 96 having an ear 98 pivoted by a stud 100 between spaced ears 102 on an arm 104 having its hub 106 pinned to a shaft 108 secured to lugs 110 on the head 30. Cooperating shoulders 112 on the arms 96 and 104 limit the downward swinging movement of the casing 76 and support it in a definite location. When the casing 76 is swung back, its supporting arm 96 rests on a lug 113 of the arm 104. The wheel 2 is kept clean by a wiper 114 secured by a clamp plate 116 to a wiper arm 118 having its hub 120 hung on the shaft 108 and pressed upwardly towards the wheel by a coil spring 121 fixed to the hub and to the shaft.

The pressure applying idler wheel 6 is mounted to turn on a ball bearing 122 between it and a supporting shaft 124 (see Figure 5). The outer race ring of the ball bearing is held against a flange of the wheel 6 by a ring nut 126 and the inner race ring is held against a shoulder of the shaft by a spacing sleeve 128. The wheel has suitable lubricating means 130 and turns freely between the cheeks 132 of a movable carrier comprising a forked arm 134 whose split hub 136 is clamped by a bolt 138 to one end of a rock shaft 140 journalled in lugs 142 and 144 on the base 10. An arm 146 pinned to the other end of the rock shaft carries a screw 148 adjusted by a thumb nut 150 and connected by a coil spring 152 to a screw anchoring stud 154 on the base. The spring yieldably holds the idler wheel 6 against the periphery of the work-piece and so holds the work-piece against the wheels 2 and 4 with a pressure that can be regulated by the thumb nut and screw in accordance with the size of the work-piece, depth of cut, etc.

As the grinding wheel carriage 18 retreats to a remote position after grinding (to the right in Figure 1) to carry the grinding wheel 8 out of its reciprocating relation to a ground work-piece W supported by the wheels 2 and 4, the pressure applying wheel 6 is automatically raised. A cam 160 (see Figures 1, 4 and 14) fastened to the carriage by bolts 162 lifts against a cam roller 164 on a plunger 166 slidable vertically in a flanged bushing 168 and in an opening 170 of the base 10, a pin 171 on the plunger entering a slot in the bore to hold the plunger from turning. The upper hardened end of the plunger engages a wear plate 172 on the end of an arm 174 whose hub 176 is secured by a taper pin to the shaft 140. This rocks the shaft against the tension of the coil spring 152 and lifts the wheel 6 enabling a ground work-piece to be easily removed and a new piece to be inserted in grinding position. The shaft can be rocked at any time by a hand lever 178 secured in a lug 180 on the hub 176 and the wheel 6 can be held in a raised position by a latch 182 pivoted at 190 on the base 10 and having a hook to engage the hand lever. When the grinding wheel carriage returns from remote position, the cam 160 lets the roller 164 descend and the wheel 6 comes down onto the next work-piece.

The same rocking movement of the shaft 140 which raises and lowers the pressure applying wheel 6 is also made to move a comparator gauge or feeler control mechanism into and out of operative relation to the work. The gauge or feeler is connected to an inclined arm 200 (see Figures 1, 2 and 7) having depending side ribs 202 which straddle an inclined guide lug 204 on a sleeve 206 surrounding the shaft between collars 208 and 210 pinned to the shaft. The guide surfaces have a 45° inclination for a reason which will later appear. A threaded stud 212 extending from the sleeve 206 into a slot 213 in the arm is provided with a clamping nut to secure the arm in adjusted position on the sleeve, adjustment being for the purpose of adapting the gauge for different sized work. Fine adjustment of the arm is effected by a hand screw 214 (see Figure 7a) held by collars 215 against longitudinal movement in the arm, the screw entering a threaded opening in the stud 212. The sleeve 206 has an arcuate slot 216 in one side face into which a pin 218 projects from the collar 208 thereby providing lost angular motion between the shaft and arm 200 to let the pressure applying wheel 6 be lifted before the gauge. The arm has a rearwardly directed webbed extension 220 with an opening or series of openings 222 for locating a nozzle for cooling fluid directed against the end of the work-piece to cool the inner and outer walls of the work-piece and wash off grit. The webbed extension terminates in a face plate 224 having a central tongue 226 to enter a groove 228 in a vertically arranged gauge carrying bracket 230 (see Figures 8, 9 and 10) secured by cap screws and dowel pins to the face plate. The bracket 230 is slotted at 232 for a flat headed clamping bolt 234 which in cooperation with a clamping nut adjustably unites the bracket to a gauge housing or body 236. There are two diamond gauge points or feelers to engage opposite points in the bore of a work-piece and the adjustment provided by the slot 232 adapts the gauge for different sizes. One diamond gauge point or feeler 238 which supports the weight of the gauge and enables it to float with the work is carried by a forward offset on an arm 240 secured by screws in a groove 242 at the lower end of the bracket 230. The other diamond gauge point or feeler 244 is carried on a side extension 246 of a bar 248 vertically slidable in a groove of the gauge housing. The bar 248 is pressed upwardly by a coil spring 250 housed in a recess of the housing and engaging a lug 252 at the upper end of bar 248. The bar can be lowered against the tension of the spring, as when inserting or removing a work-piece, by a cam or eccentric 254 pinned to a shaft 256 and manipulated by a knurled knob 258 pinned to the end of the shaft outside a cover plate 260 secured to the gauge housing. The front side of the bar 248 has a notch the lower edge of which is bevelled or ridged as at 261 to engage the lower edge of a multiplying lever or control member 262 pivoted at 264 in a recess of the gauge housing. The lever has an extension 266 at its free end engaging the spring pressed stem 268 of an indicator 270 held in a recess of the housing by a detachable cap 272. The indicator dial and needle indicate the increase in the internal diameter of the work-piece as the latter is being ground, the proper reading to indicate the finished internal size being found by the use of a master or reference work-piece of the size desired. When the piece is ground, the retreat of the grinding carriage causes the successive lifting of the pressure applying wheel 6 and the indicator gauge. As the indicator gauge is lifted, the diamond gauge points are lifted with it, thereby lifting the work-piece from between the flanges of the wheel 4. The cam 254 is then turned to depress the upper diamond to allow the piece to be removed in an axial direction and to allow another piece to be applied. Then the cam is turned back to release the upper diamond for yielding contact with the new work-piece. The return of the grinding carriage to grinding position lowers the gauge parts and the pressure applying idler wheel 6 successively to operative position. The lost angular motion between the gauge and the wheel 6 lets the weight of the gauge parts rest on the lower diamond during grinding. Thus, the gauge floats on the inner wall of the work and this is very important because it avoids any error in the diameter indication which would occur if the piece were out-of-round externally. High spots are sometimes found on work pieces which are ground externally on centerless grinders. These high spots would make the work rise as they engaged the supporting idler wheel but, as the lower diamond rises, it lifts the gauge parts, including the upper diamond, with it, and so makes the gauge indicate the true diameter of the bore. Hence errors due to external out-of-roundness are eliminated. The gauge does not become heated because the work is kept cool by liquid which has access to both inner and outer walls and each supporting wheel has a continually changing line of contact with the work, thereby facilitating cooling. The work, then, is measured when cool and by a cool gauge so that final size is truly indicated. Inasmuch as the gauge and indicator indicate the finished internal size by comparison with a master or reference work-piece, the two diamonds need not be precisely in the vertical plane through the center of the work-piece but it is desirable to have actual size indications and they can actually be obtained because the adjustment provided between the arm 200 and the sleeve 206 enables the diamond points to be placed in any one of a series of parallel planes through the axis of the work. In the present instance, these are vertical planes and the line of adjustment between the arm 200 and the sleeve 206 is accordingly inclined at 45° to the vertical. If the lower diamond is adjusted downwardly and to the left to engage a larger work-piece, the upper diamond can be correspondingly raised by means of the adjustment provided by the slot 232 and clamping bolt 234. Hence both diamonds can be made to engage analogous points on work of different sizes.

Figure 11:
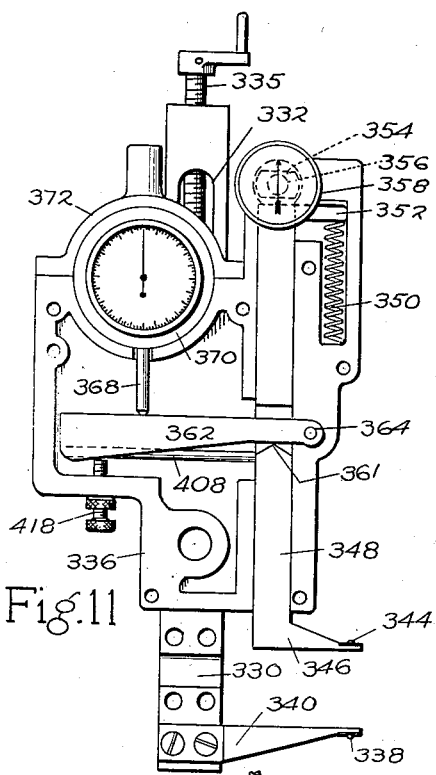
Figs. 11 and 12 are front views of an improved feeler control gauge, the cover plate being removed in Fig. 11.
Figure 12:
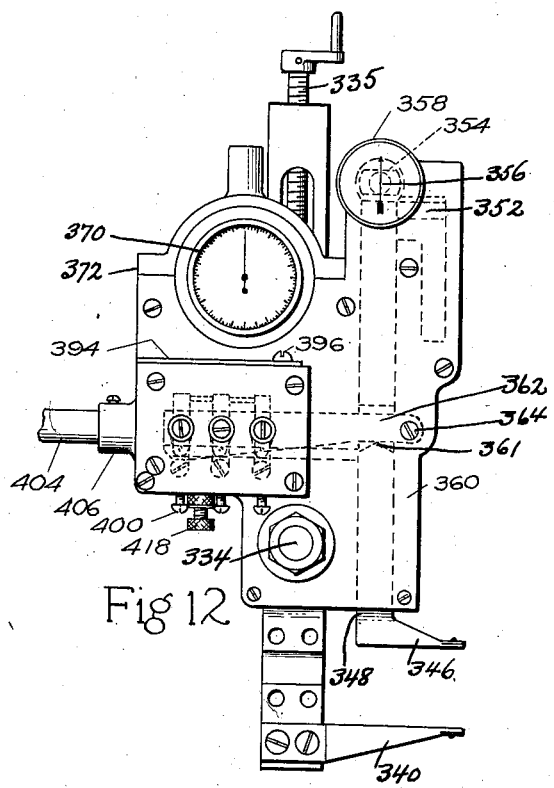
Figure 13:
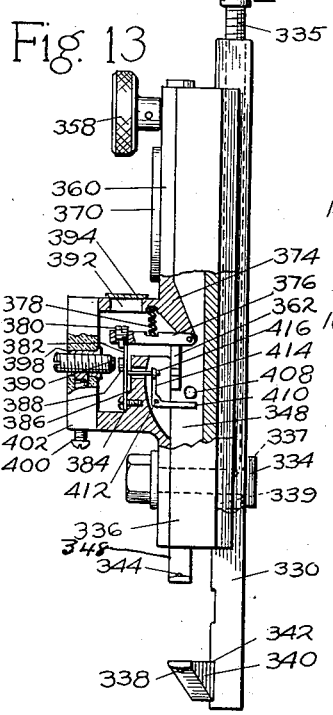
Fig. 13 is a side view, partly in section, of the gauge.

In Figures 11, 12 and 13 another form of gauge or feeler is shown which electrically controls automatically any of the usual or desired operations of an internal grinding machine to thereby enable a single operator to operate a plurality of machines. Such controlled operations may, for instance, be the dressing of the grinding wheel, the slowing down of the traverse for finish grinding, a second dressing of the wheel prior to finishing, and the retraction of the wheel to a remote position where the machine is stopped as shown in the before mentioned patents. In its size indicating features, this device is similar to the above described comparator gauge and feeler. It comprises a vertical bracket 330 for attachment to the face plate 224 of Figures 1, 7 and 8. The bracket is slotted at 332 for a flat headed clamping bolt 334 which is secured by a clamping nut to a gauge housing or body 336.

The gauge housing is vertically adjusted on the bracket by a screw 335 threaded in the upper end of the bracket and having a reduced cylindrical extension 337 passing through a hole in the bolt 334 and held against axial movement by a collar 339. The lower diamond or feeler 338 is carried by an offset arm 340 secured in a groove 342 at the lower end of the vertical bracket and the upper diamond or feeler 344 is carried on a lateral extension 346 of a vertically slidable bar 348. A coil spring 350 tends to raise the bar by engagement with a lug 352; a cam 354 pinned to a shaft 356 and turned by a knob 358 is utilized to lower the bar which is held in its groove by a cover plate 360. A bevel or ridge 361 in a notch of the bar engages a multiplying lever or control member 362 pivoted at 364 and the lever engages a stem 368 on an indicator 370 secured in a recess of the housing by a cap 372.

The upward movement of the lever or control member 362 as grinding proceeds is made to complete in succession a series of electric circuits. The cover plate 360 has an internal projection 374 with notches in which a series of three arms 376 are pivoted to project forwardly into an enlargement of the cover plate. Each arm is pressed downwardly by a light coil spring 378 to hold a shouldered screw 380 in front of a flat leaf spring 382 which is normally flexed and secured by a screw 384 to a partition 386. Each leaf spring carries a contact button 388 arranged to engage a corresponding adjustable contact screw 390 when the corresponding shouldered retaining screw 380 is lifted sufficiently by the lever 362 and arm 376 to clear the leaf spring. The three screws 380 are adjusted to release their springs at different times, an opening 392 in the top of the enlargement over each screw allowing access of a suitable screw driver when a thin shield or plate 394 is swung to the front around a pivot screw 396. Each of the three contact screws 390 is adjustable to set its gap with contact button 388 and is secured in a tapped bushing 398 by a clamping screw 400 run up into a terminal block 402 of insulating material fastened on the front of the enlargement. The leaf springs and their corresponding contact screws are the terminals of a series of electric circuits, the leaf springs being electrically grounded through the indicator housing and the screws 390 being connected to insulated wires led through a flexible tubing 404 attached to a hollow boss 406 on one side of the enlargement.

To reset the leaf springs 382 in open circuit position, which is accomplished when the cam is turned to depress the bar 348, as when putting a work-piece in position over the diamonds, a rod 408 on the sliding bar 348 engages the horizontal arm 410 of each of a series of bell crank levers pivoted at 412 in arcuate notches in the back of the partition 386. Vertical arms 414 of the bell crank levers are forked to engage headed pins 416 attached to the respective leaf springs to draw the leaf springs back behind their retaining screws 380. A screw 418 engages the multiplying lever 362 to limit its downward movement when the bar 348 is lowered. Hence wear on the indicator is reduced because it does not begin to register until the ridge 361 rises enough to lift the multiplying lever. In setting the indicator, a master or reference work-piece is placed over the diamond points in the grinding position and the indicator dial set to read zero. One of the screws 380 is set to release its leaf spring at this finished position of the multiplying lever. Another of the screws 380 is set, say, to release its leaf spring when the piece to be ground is a thousandth of an inch from completed size. The remaining screw 380 is set, say, to release its leaf spring three thousandths of an inch from finished size. The three screws can thus be set once for all with respect to each other and to the zero of the dial indicator; then for any subsequent work of a different size, the entire apparatus can be set by manipulating the vertical adjusting screw 335 until the indicator again registers zero to a master. After each circuit is closed and before the next is closed, the movements of the grinding carriage or the feed mechanism can be utilized to open a switch to break the circuit. Likewise the return movements of the carriage can be utilized to set the circuits ready for repeating the operations.

I claim:

1. In a chuckless machine for cutting the bore of a hollow work-piece, rotatable wheels for supporting and rotating the work-piece by engagement with the outer periphery thereof, a cutting tool, means providing for relative axial movement between the cutting tool and work-piece, and means automatically operated by the relative axial movement for moving one of the wheels into or out of engagement with the work-piece; substantially as described.

2. In a chuckless machine for cutting the bore of a hollow work-piece, rotatable wheels for supporting and rotating the work-piece by engagement with the outer periphery thereof, a cutting tool movable into and out of the bore of the work-piece, a carriage for the cutting tool, a cam on the carriage, and means controlled by the cam for moving one of the wheels into or out of engagement with the work-piece; substantially as described.

3. In a chuckless machine for cutting the bore of a hollow work-piece, rotatable wheels for supporting and rotating the work-piece in a floating manner by changing line contact with the outer periphery thereof to leave the bore unobstructed at both ends and the peripheral area exposed, a cutting tool, a carriage to provide for relative movement between the cutting tool and the wheels whereby the cutting tool can be made to project into one end of the work-piece, and a bodily floating gauge having a supporting member entering the other end of the work-piece, said gauge supporting member being constructed and arranged to ride on the inner surface of the work-piece to support the gauge for floating bodily with the work-piece; substantially as described.

4. In a chuckless machine for cutting the bore of a hollow work-piece, rotatable wheels for supporting and rotating the work-piece by changing line contact with the outer periphery thereof, a cutting tool, a carriage to provide for relative movement between the cutting tool and the wheels whereby the cutting tool can be made to project into one end of the work-piece, a gauge having a feeler member to enter the bore of the work-piece, said feeler member supporting the gauge by contact with the inner wall of the work-piece, and means automatically operated by the movement of the carriage for moving the feeler member into and out of operative position; substantially as described.

5. In a chuckless machine for cutting the bore of a hollow work-piece, rotatable wheels for supporting and rotating the work-piece by engagement with the outer periphery thereof, a cutting tool, a carriage to provide for relative movement between the cutting tool and the work-piece, a gauge having a feeler member to enter the bore of the work-piece, a movable carrier for one of the work engaging wheels, and means automatically operated by the movement of the carriage for moving the feeler member and the wheel carrier into and out of operative position; substantially as described.

6. In a chuckless machine for cutting the bore of a hollow work-piece, rotatable wheels for supporting and rotating the work-piece by engagement with the outer periphery thereof to leave the bore unobstructed at both ends and the peripheral area exposed, a cutting tool, means for providing for relative movement between the cutting tool and the wheels whereby the cutting tool can be made to project into one end of the work-piece, a rocking arm at the other end of the work-piece, and a gauge carried by the arm and having a supporting member entering said other end of the work-piece to support the gauge on the work-piece; substantially as described.

7. In a chuckless machine for cutting the bore of a hollow work-piece, rotatable wheels for supporting and rotating the work-piece by engagement with the outer periphery thereof to leave the bore unobstructed at both ends, a cutting tool, a carriage to provide for relative movement between the cutting tool and the wheels whereby the cutting tool can be made to project into one end of the work-piece, a rocking arm, a gauge member carried by the arm and entering the other end of the work-piece, and means automatically operated by the movement of the carriage for rocking the arm; substantially as described.

8. In a chuckless machine for cutting the bore of a hollow work-piece, rotatable wheels for supporting and rotating the work-piece in a floating manner by engagement with the outer periphery thereof to leave both ends unobstructed, a cutting tool arranged to project into one end of the work-piece, and a gauge having a supporting member arranged to project into the other end of the work-piece and riding on the inner wall of the work-piece to support the gauge as a whole on the work-piece for floating bodily therewith; substantially as described.

9. In a chuckless machine for cutting the bore of a hollow work-piece, rotatable wheels for supporting and rotating the work-piece in a floating manner by engagement with the outer periphery thereof to leave both ends unobstructed, a cutting tool arranged to project into one end of the work-piece, and a floating gauge having a pair of spaced feeler members engaging opposite points in the bore of the work-piece and projecting into the bore from the other end, the feeler members having a relative measuring movement and one of them supporting the gauge including both such feeler members for bodily floating movement with the work-piece whereby such floating does not produce relative movement of the feeler members; substantially as described.

10. In a chuckless machine for cutting the bore of a hollow work-piece, rotatable wheels for supporting and rotating the work-piece in a floating manner by engagement with the outer periphery thereof to leave both ends unobstructed, a cutting tool arranged to project into one end of the work-piece, a gauge having a supporting member riding on the inner wall of the work-piece to support the gauge on the work-piece for bodily floating therewith, and a second gauge member riding on another point of the work-piece, said second gauge member floating with the gauge and its supporting member but movable with respect to the supporting member as the piece changes in size; substantially as described.

11. In a chuckless machine having a plurality of wheels for supporting a round work-piece, a movable support for one of the wheels, a movable reference plate, means for indicating the position of the reference plate for different sized work-pieces, and means for adjusting the support to cause a selected reference work-piece supported by the wheels to contact with the reference plate at the corresponding indicated position; substantially as described.

12. In a chuckless machine having a plurality of wheels for supporting a round work-piece, a supporting arm, a reference plate movably carried by the arm, means for indicating different positions of the reference plate for different sized work-pieces, and means for locating the wheels to support the different sized work-pieces in positions corresponding to the positions of the reference plate; substantially as described.

13. In a chuckless machine for operating on round work-pieces, a backing wheel and a supporting wheel for engagement with the outer periphery of the work-pieces, means for moving the backing wheel to compensate for wear, and a wheel setting plate for locating the backing wheel in a position to contact with all work-pieces in the same line; substantially as described.

14. In a chuckless machine for precision grinding of the bore of hollow round work-pieces, a grinding wheel, a gauge for indicating the size of a work-piece during grinding, wheels for rotatably supporting the work-piece in a floating manner by a changing line contact with the outer periphery thereof to leave all surfaces of the piece exposed to cooling medium whereby dimensional characteristics of the piece are maintained by the close temperature control during the grinding operation, and means for floatingly mounting the gauge to locate the latter bodily from the work itself to thereby compensate the gauge for variation in the location of the work; substantially as described.

15. In a chuckless machine for operating on round work-pieces, rotatable wheels for supporting and rotating the work-piece by line contact with the periphery thereof, a cutting tool, a carriage to provide for relative movement between the cutting tool and the work-piece, and means actuated by the movement of the carriage for moving one of the wheels into or out of engagement with the work-piece; substantially as described.

16. In a chuckless machine for operating on the bore of a hollow work-piece, rotatable wheels for supporting and rotating the work-piece by changing line contact with the outer periphery thereof, a gauge having a feeler member to enter the bore of the work piece and ride on the inner wall of the work-piece, and mechanism for operating the gauge to lift the work-piece from the supporting wheels; substantially as described.

17. In a chuckless machine for cutting the bore of a hollow work-piece, a cutting tool, means for supporting and rotating the work-piece in a manner to leave both its ends unobstructed, a carriage to provide for relative movement between the cutting tool and the work-piece whereby the cutting tool can be made to project into one end of the work-piece, a bodily floating gauge mounted at the other end of the work-piece, and a gauge-supporting feeler projecting from the gauge and entering said other end of the work-piece, said feeler riding on the inner wall of the work-piece during the cutting operation and supporting the gauge therefrom; substantially as described.

18. In a chuckless cutting machine, a cutting tool, rotatable wheels for supporting and rotating the work-piece by engagement with the outer periphery thereof, one of said wheels having an integral work engaging flange, and a flanged member axially adjustable with respect to the first flange; substantially as described.

19. An internal grinder including spaced members providing a work receiving throat for exterior engagement with a work-piece, means for rotating one of said members to frictionally impart a rotating movement to the work-piece, a grinding member projecting into the throat for internal engagement with a work-piece supported therein, means for imparting relative lateral movement to the grinding member and one of the throat forming members to operatively associate and disengage the work and grinding member, and means movable with respect to the throat forming members and adapted to engage the internal surface of the work-piece for dislodging a disengaged work-piece from the throat forming members.

20. An internal grinder, including opposed grinding and regulating wheels for engagement respectively internally and exteriorly with a work piece, a work support for laterally exteriorly engaging the work piece and steadying same during the grinding thereof disposed in fixed relation to one of said wheels, means for controlling a relative traversing movement of the work and grinding wheel during operative engagement therebetween, means for controlling separation of the grinding wheel and the work, and means engaging the internal surface of the work for dislodging the released work from the work support.

21. In a machine for grinding the interior of tubular articles, the combination with a grinding wheel for operation on the interior of the work piece, of work supporting and positioning means for exterior engagement with the work piece including a work rest and a plurality of rotatable members for co-operative engagement with the periphery of the work piece for determining its position on said rest, means for yieldably urging one of said rotatable members in the direction of the other for engagement of the work piece therebetween, means for separating said members to relieve the work piece of their joint pressure thereagainst, and means operative to shift a work piece out of engagement with the rest when the pressure members are in work releasing relation.

22. In a machine of the character indicated, work supporting means including a work rest and a plurality of work-engaging members, one member being a regulating wheel, means for yieldably urging one of said work-engaging members upon the work, means for separating said members to relieve the work-piece of their joint pressure, and means operative to dislodge the work-piece when it is so relieved.

23. A machine for internal precision grinding of tubular articles, including a bed, an internal grinding wheel spindle supported by the bed, a high speed internal grinding wheel carried thereby for operative engagement with the interior of a work piece, means supporting the work piece in telescoping relation to the grinding wheel and spindle for rotation on its periphery comprising a work rest and a slowly rotating wheel having a non-yielding surface disposed in opposition to said work rest for joint determination therewith of the position of a work piece having its periphery engaged by said parts, means for effecting decrease of the separation between the grinding and regulating wheels to cause joint operative engagement of the wheels respectively with the inner and outer surfaces of the tubular work piece and for subsequently separating the wheels to discontinue said joint operative engagement of the work thereby, and means operable in timed relation to the relative movement of the wheels for dislodging a released work piece.

24. In a grinding machine, the combination with a grinding wheel, workholding means, and a table or carriage carrying one of said parts adapted, when reciprocated, to produce a relative working traverse between wheel and work-piece, of a plurality of rotatable rolls one of which is movable with respect to the others constituting said workholding means, and means operated by the movement of said table for actuating the movable roll.

25. A grinding machine, having, in combination, a carriage having an idle position and a position in which it reciprocates, workholding means comprising a plurality of rotatable rolls one of which is movable with respect to the others to provide for introduction and discharge of workpieces, and connections between said movable roll and said carriage to cause the former to be moved by the latter when it nears the idle position, and to be moved in the reverse direction when the carriage moves toward the position in which it reciprocates, and means to provide for reciprocation of the carriage without effect upon the said movable roll.

26. An internal grinding machine, including a work support, a regulating wheel spaced therefrom, a grinding member projecting between said parts for internal engagement with a work-piece supported thereby, means for resiliently urging a work-piece in the direction of the regulating wheel, and mechanism for automatically freeing a ground work-piece from said resilient urging means; substantially as described.

27. An internal grinding machine, including a work support, a regulating wheel spaced therefrom, a grinding member projecting between said parts for internal engagement with a work-piece supported thereby, means for resiliently urging a work-piece in the direction of the regulating wheel, mechanism for freeing a ground work-piece from said resilient urging means, and means for dislodging the ground work-piece from the work support; substantially as described.

28. The process of producing a hollow work-piece of controlled wall thickness which consists in rotatably supporting the work-piece by floating it on its outer peripheral surface to expose all areas to cooling, floating a gauge upon the inner surface of the work-piece, and removing stock from the inner surface in accordance with gauge indications; substantially as described.

29. In a machine of the character described, a backing member engaging one peripheral surface of a hollow work-piece, a tool engaging the other peripheral surface of the work-piece in substantially direct opposition to the backing member, means for holding the work-piece in rotating contact with the backing member, means for causing a movement of separation between the tool and the work-piece, and mechanism operating in timed relation to said movement of separation for releasing the work-piece from the holding means; substantially as described.

30. In a machine of the character described, a backing member engaging one peripheral surface of a hollow work-piece, a tool engaging the other peripheral surface of the work-piece in substantially direct opposition to the backing member, a roller for holding the work-piece in rotating contact with the backing member, means for causing a movement of separation between the tool and the work-piece, and mechanism operating in timed relation to said movement of separation for releasing the work-piece from the roller; substantially as described.

31. In a machine of the character described, a backing member engaging one peripheral surface of a hollow work-piece, a tool engaging the other peripheral surface of the work-piece in substantially direct opposition to the backing member, means for holding the work-piece in rotating contact with the backing member, means comprising a table for causing a movement of separation between the tool and the work-piece, and a cam operated by movement of the table for effecting release of the work-piece from the holding means; substantially as described.

32. In a machine of the character described, a regulating wheel engaging one peripheral surface of a hollow work-piece, a tool engaging the other peripheral surface of the work-piece in substantially direct opposition to the regulating wheel, means for urging the work-piece against the regulating wheel, means for causing a movement of separation between the tool and the work-piece in a direction substantially lengthwise of the work-piece, and mechanism operating in timed relation to said movement of separation for relieving the work-piece from said urging means; substantially as described.

33. In a machine of the character described, a regulating wheel engaging the outer surface of a hollow work-piece, a tool engaging the inner surface of the work-piece in substantially direct opposition to the regulating wheel, means for holding the work-piece in rotating contact with the regulating wheel, means for causing a movement of separation between the tool and the work-piece in a direction substantially lengthwise of the work-piece, and mechanism controlled by said movement of separation for releasing the work-piece from the holding means; substantially as described.

34. In a precision machine of the character described, angularly spaced members having smooth surfaces for rotatably supporting a hollow work-piece by line contact with one peripheral surface thereof to provide for floating support of the work-piece, a work-altering tool operating on the opposite surface of the work-piece, and a gauge including size detecting means movable with respect to the work in response to change in size of said opposite surface, the gauge being constructed and arranged to float as a whole with the work while supported thereon to thereby compensate the size detecting means for variation in the location of the work; substantially as described.

35. In a precision machine of the character described, angularly spaced members having smooth surfaces for rotatably supporting a hollow work-piece by line contact with the outer peripheral surface thereof to provide for floating support of the work-piece, a work-altering tool operating on the inner peripheral surface of the work-piece, and a gauge supported on the inner peripheral surface of the work-piece and bodily floating therewith; said gauge having size detecting means movable relatively to the work-piece in response to change in size of said inner surface without having relative movement imposed upon it by floating movement of the work-piece; substantially as described.

36. In a precision machine of the character described, angularly spaced members having smooth surfaces for rotatably supporting a round work-piece by line contact with the peripheral surface thereof to provide for floating support of the work-piece, a work-altering tool, and a gauge supported by the work-piece and having a feeler movable with respect to the work in response to change in size of the work, the gauge being constructed and arranged to float as a whole with the work to thereby compensate the feeler for variation in location of the work; substantially as described.

37. In a precision machine of the character described, angularly spaced members having smooth surfaces for rotatably supporting a round work-piece by changing line contact with the peripheral surface thereof, a work-altering tool operating on the work-piece, a gauge having a supporting member engaging the work-piece to support the gauge thereon, and means for causing relative movement between the gauge supporting member and the work-supporting members to disengage the gauge supporting member from the work-piece; substantially as described.

38. In a machine of the character described, angularly spaced members for rotatably supporting a round work-piece by line contact with the peripheral surface thereof, a work-altering tool operating on the work-piece, means for causing a movement of separation between the tool and the work-piece, a gauge having a supporting member engaging the work-piece to support the gauge thereon, and mechanism operating in timed relation to said movement of separation for causing relative movement between the gauge supporting member and the work supporting members to disengage the supporting member from the work-piece; substantially as described.

39. In a machine of the character described, angularly spaced members for rotatably supporting a hollow work-piece by line contact with one peripheral surface thereof, a work-altering tool operating on the opposite surface of the work-piece, means for causing a movement of separation between the tool and the work-piece, a gauge having a supporting member engaging said opposite surface of the work-piece to support the gauge thereon, and mechanism operating in timed relation to said movement of separation for moving the gauge supporting member and the gauge with respect to the work supporting members to disengage the supporting member from the work-piece; substantially as described.

40. In a machine of the character described, a backing member engaging the peripheral surface of a round work-piece, a tool engaging the work-piece, means for holding the work-piece in rotating contact with the backing member, a gauge having a member engaging the workpiece, and mechanism for separating the tool and the work-piece and thereby causing the release of the work-piece from the holding means together with a movement of the gauge to inoperative position; substantially as described.

41. In a machine of the character described, a backing member engaging the peripheral surface of a round work-piece, a tool engaging the work-piece, means for holding the work-piece in rotating contact with the backing member, a gauge having a member engaging the work-piece, means for causing a movement of separation between the tool and the work-piece, and mechanism controlled by said movement of separation for moving the holding means and the gauge to inoperative position; substantially as described.

42. In a machine of the character described, a regulating wheel engaging the outer peripheral surface of a hollow work-piece, a tool engaging the inner surface of the work-piece, a gauge engaging the inner surface of the work-piece, means for holding the work-piece in rotating contact with the regulating wheel, means for causing a movement of separation between the tool and the work-piece, and mechanism controlled by said movement of separation for releasing the work-piece from the holding means and for moving the gauge to inoperative position; substantially as described.

43. In a machine of the character described, angularly spaced members for rotatably supporting a round work-piece by line contact with the peripheral surface thereof, means for holding the work-piece in rotating contact with the supporting members, a work-altering tool operating on the work-piece, a gauge having a supporting member engaging the work-piece to support the gauge thereon, and mechanism for releasing the work-piece from the holding means and for causing relative movement between the gauge and the angularly spaced members to separate the gauge supporting member from the work-piece; substantially as described.

44. In a machine of the character described, angularly spaced members for rotatably supporting a work-piece by contact with the peripheral surface thereof, a movable reference plate, means for determining the position of the reference plate for different sized work-pieces, and means for adjusting one of the angularly spaced members to cause any selected work-piece to engage the reference plate at the determined position; substantially as described.

45. In a machine of the character described, angularly spaced members for rotatably supporting a work-piece by contact with the peripheral surface thereof, a movable reference plate for determining the location of a work-piece, and means for adjusting one of the angularly spaced members so that both of such members will engage the work-piece in said determined location; substantially as described.

46. In a machine of the character described, a backing member and a supporting member for rotatably supporting a work-piece by line contact with the peripheral surface thereof, and a setting plate for locating the backing member in a definite place; substantially as described.

47. In a machine of the character described, angularly spaced members for rotatably supporting a work-piece by contact with the peripheral surface thereof, at least one of said members being a rotatable wheel, a work-altering tool for operating on the work-piece, and a wiper engaging the periphery of the wheel; substantially as described.

48. In a machine of the character described, angularly spaced members for rotatably supporting a hollow work-piece in a floating manner by changing line contact with the peripheral surface thereof to leave both ends of the piece open and unobstructed, a work-altering tool entering one end of the piece, and a bodily floating gauge having a supporting feeler entering the other end of the piece to support the gauge as a whole from the work-piece; substantially as described.

49. In a machine of the character indicated, the combination with a work-support and a tool support, one of said supports carrying a cam and the other a cam follower, movable means for securing a work-piece upon and in contact with the work-support, an element connected to said securing means and to one of the cams and the follower, and means for causing relative movement between the supports to co-operatively associate the cam and the follower whereby upon relative approach of the supports the work-piece is secured upon the work-support and upon relative separation of the supports the work-piece is released; substantially as described.

50. In a device of the character described, members for exteriorly supporting a hollow work-piece, means for rotating one of said members to rotate the work-piece, a grinding member adapted to have telescoping relation with the work-piece, means for imparting relative movement between the grinding member and the work-piece for effecting the withdrawal of the grinding member and the work-piece from their telescoping relation, and means for radially dislodging the work-piece from the supporting members when such withdrawal occurs; substantially as described.

51. An internal grinding machine including a rotary work support, a regulating wheel spaced therefrom, a grinding member arranged to be positioned between said parts for internal engagement with a work-piece supported thereby, means for resiliently urging a work-piece in the direction of the regulating wheel, mechanism for freeing a ground work-piece from said resilient urging means, and means for dislodging the ground work-piece substantially radially from the work support; substantially as described.

52. In a grinding machine, an internal grinding means, means for peripherally supporting and frictionally rotating a round work-piece for a grinding operation on an internal surface thereof, a movable carriage on which one of said means is mounted, and means responsive to movement of said carriage for radially dislodging a finished work-piece from its supporting means; substantially as described.

53. In a grinding machine, the combination with a grinding wheel, workholding means, and a table or carriage carrying one of said parts adapted, when reciprocated, to produce a relative working traverse between wheel and work-piece, said table having an operative position and an inoperative position with the grinding wheel axially spaced from a workpiece in the workholding means, of a plurality of rotatable rolls one of which is movable with respect to the others constituting said workholding means, and means operated by the movement of said table as it moves into operative position for actuating the movable roll into workholding position.

54. In a grinding machine, the combination with a grinding member and a work-supporting member, the latter comprising spaced rolls for engagement with the periphery of a workpiece on opposite sides thereof, and a support beneath said rolls for engagement with the periphery of said workpiece, one of said rolls being rotated to procure rotation of the workpiece, and a table or carriage carrying one of said members adapted when reciprocated to produce a relative working traverse between said grinding member and workpiece, said table having an operative position and an inoperative position with the grinding member axially spaced from the workpiece, of means for moving one of said rolls relative to the other, and means operated by the movement of said table into operative position for actuating the movable roll into work-supporting position.

55. In a grinding machine, the combination with a grinding member and a work-supporting member, the latter comprising spaced rolls for engagement with the periphery of a workpiece on opposite sides thereof, and a support beneath said rolls for engagement with the periphery of said workpiece, one of said rolls being rotated to procure rotation of the workpiece, and a table or carriage carrying one of said members adapted when reciprocated to produce a relative working traverse between said grinding member and workpiece, said table having an operative position and an inoperative position with the grinding member axially spaced from the workpiece, of means for moving one of said rolls relative to the other, said roll being actuated in response to movement of said table into operative position.

PHILIP H. HUTCHINSON.